K. TSUBOI.
PRUNING IMPLEMENT.
APPLICATION FILED JULY 9, 1913.
1,109,488.
Patented Sept. 1, 1914.
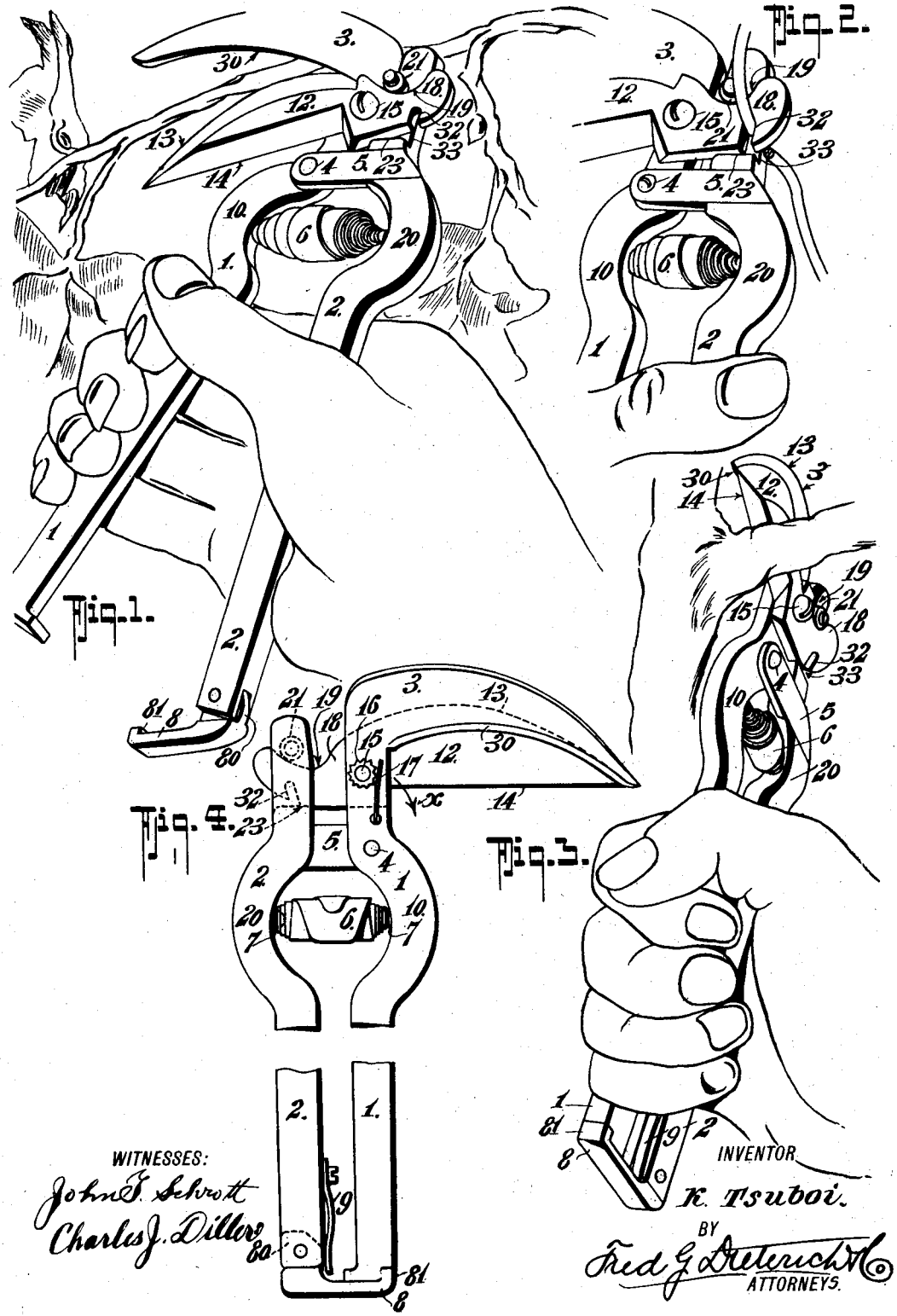
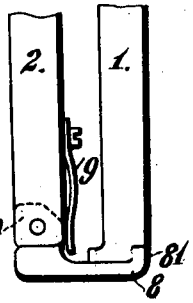
WITNESSES:
John F. Schrott
Charles J. Diller
INVENTOR
K. Tsuboi.
BY
Fred G. Dieterich
ATTORNEYS.

UNITED STATES PATENT OFFICE.

KAYOZI TSUBOI, OF PORTLAND, OREGON.

PRUNING IMPLEMENT.

1,109,488. Specification of Letters Patent. Patented Sept. 1, 1914.

Application filed July 9, 1913. Serial No. 778,022.

*To all whom it may concern:*

Be it known that I, KAYOZI TSUBOI, residing at Portland, in the county of Multnomah and State of Oregon, have invented certain new and useful Improvements in Pruning Implements, of which the following is a specification.

My invention comprehends certain improvements in that type of pruning devices in which the blades are coöperatively so mounted to thereby adapt them for effecting the pruning or cutting operation with a shearing or sliding cut, and my said invention primarily has for its object to provide a pruning implement of the general character stated of a simple and economical construction, in which the several parts are so combined that the implement is readily manipulated with one hand.

Again, my invention has for its object to provide a pruning implement in which the shearing or cutting members and the handle portions are correlatively arranged for readily permitting the use of the shearing members for hacking or chopping the sprigs or tough stems.

With the above and other objects in view, my invention embodies the peculiar construction and novel arrangement of the parts hereinafter explained, specifically pointed out in the appended claims and illustrated in the accompanying drawings, in which:—

Figure 1 is a perspective view of my invention, the same being shown in an operative position. Fig. 2 is a perspective view of a portion of the upper or head end of my improved implement, the same being shown as utilized for cutting wire. Fig. 3 is a perspective view of my invention, the same being shown as a chopping or hacking device. Fig. 4 is a side elevation of my invention, parts being shown as held to their normal or closed position.

In the drawing, 1—2 designate the opposing members of the pruning implement and they constitute the handle or lever members one of which (1) extends beyond the other member 2 and terminates in a cutter head 3 that is integral with the handle member 1 and projects laterally therefrom, in a plane substantially at right angles to the said body 1, as is clearly shown in Fig. 4. The under edge of the head 3 is curved and the said edge forms a cutting blade 30 that extends from the inner to the tapered outer end of the said head. The handle member 1 is mounted on a pivot stud 4 projected from a lateral extension 5 integral with the body or handle member 2. The two handle members 1—2 are normally spread apart by a helical spring 6 located between the curved portions 10—20 of the handles 1—2, each of which has a stud bearing 7 upon which the opposite ends of the spring 6 seat.

8 designates a latch lever that is pivotally mounted on the lower end of the member 1 and normally held to project laterally from the member 1 by a spring 9 that engages the heel 80 of the latch, the latter having a rounded lip 81 for slipping over and interlocking with the lower end of the handle member 2 when the two handles are closed together, as shown in Figs. 3 and 4.

12 designates the movable cutter head, the construction of which is best shown in Fig. 4, by reference to which it will be seen that the said cutter includes a convexedly shaped shearing edge 13 that moves over and coacts with the concaved cutting edge of the relatively fixedly held cutter. Cutter 12 also includes a straight edge that is beveled to form a back or chopping blade 14, which may be conveniently utilized for chopping off or hacking sprigs, small limbs, etc., when the implement is held closed, as shown in Fig. 3.

The movable cutter head 12 is fulcrumed on a pivot bolt 15 that passes through the head 12 and the handle member 1, it being held secure by the nut 16, which, in practice, is held from turning by a lock spring 17. The cutter head 12 has a rearwardly extended heel member 18 formed with a curved bearing edge 19 for engaging a roller stud 21 on the upper end of the handle member 2.

By reason of mounting the pivoted or movable cutter head 12 on a pivot on the blade that carries the pivot bolt 15 and located above the said bolt, when the two handles 1 and 2 are loosened up, the spring 6 causes the handle members 1 and 2 to spread and their upper or head ends to close toward each other and in so doing the inward movement of the cutter head carries the pivoted cutter in the direction of the arrow *x*, (Fig. 4) and in doing so, causes the heel of the said pivoted cutter to engage a shoulder 23 on the handle member 2, it thereby moves the shearing blade of the cutter 12 away from the shearing blade on the other member 1, it being obvious that in closing the two hand members 1 and 2 for pruning (as in Fig. 1) the roller stud engages the heel of the cutter head and gradually closes the movable shearing blade over the relatively fixed shearing blade.

By forming the movable cutter 12 with a supplemental or chopping blade arranged as shown and providing means for interlockably securing the members 1 and 2 to adjust the two cutter heads to act as a single member, a simple and effective means is provided for chopping or hacking such twigs or branches that the shearing blades can not sever, it being apparent that by providing a means for holding the members 1 and 2 rigid, the shearing blades of the opposing cutter heads are fully protected during the operation of chopping or hacking with the supplemental blade or edge.

In the complete form of my implement, I utilize the heel portion of the movable cutter as a wire shear or cutter, the said heel having an elongated recess 32 that moves over a wire passage 33 in the upper end of the member 2 (see Fig. 2).

From the foregoing taken in connection with the complete construction, the manner of using and the advantages of my invention will be readily understood.

What I claim is:

1. In a pruning implement, a pair of handle members each including a bowed portion, one of said handle members having a laterally projecting cutter head, the other of said members having laterally projecting ears to which the opposing handle member is pivoted, a second cutter member pivoted to the handle member that carries the first mentioned cutter member, said second cutter member projecting laterally to coöperate with said first mentioned cutter member and having a heel portion projecting over to the opposite handle member, said heel portion having a curved surface, said other handle member having a member to engage said heel, said last named member and said heel operating when said handle members are closed together, to close said cutters, and means held between said handle members at said bowed portions to continuously tend to separate said handle members, substantially as shown and described.

2. In a pruning implement, a handle member having a relatively rigid laterally projecting cutter head, a second handle member, a pivotal connection between said handle members, a second cutter member pivoted to the first mentioned handle member and projecting laterally in the same direction as the first mentioned cutter member to coöperate therewith, said second cutter member having a heel portion projecting over to the second handle member, said heel portion having a cam surface, a roller relatively fixedly located on said second handle member to engage and coöperate with said cam surface when said handle members are closed together to close said cutters, a spring continuously tending to separate said handles to open said cutters, said second cutter member having two cutting edges one to coöperate with said fixed cutting member and the other cutting edge being located opposite to said first mentioned cutting edge, and means for holding said handle members closed together against the tension of said spring, whereby said cutter heads may be maintained with their adjacent cutting edges closed, substantially as described.

3. In a pruning implement, a first and a second handle member, the first of said handle members having an integral laterally projecting cutter head, said second handle member having laterally projecting ears to which said first handle member is pivoted, a second cutting member pivoted to the first handle member and projecting laterally to coöperate with said first cutter member, and having a heel portion projecting over to the second handle member, said heel portion having a cam surface, a member on said second handle member to coöperate with said cam surface when said handle members are opened and closed to correspondingly open and close said cutters, all being arranged substantially as shown and described.

4. In a pruning implement, a pair of handle members each including a bowed portion, one of said handle members having an integrally formed laterally projecting cutter head, the other of said handle members having laterally projecting ears to which the opposing handle member is pivoted, a second cutter member pivoted to the handle member that has the integral cutter member, said second cutter member projecting laterally to coöperate with said first cutter member and having a heel portion projecting over to the opposite handle member, said heel portion having a cam surface, a member on the adjacent handle member for coöperating with said cam surface when said handle members are closed together to close said cutters, and an expansion spring held between said handle members at said bowed portions, substantially as shown and described.

5. In a pruning implement, a first and a second handle member, a cutter head integrally formed with said first handle member and projecting laterally therefrom, a second cutter head pivoted to said first handle member adjacent to said first mentioned cutter head, said second cutter head having a laterally projecting heel provided with a cam surface, said second handle member having laterally projecting ears pivoted to said first handle member, means on said second handle member to coöperate with said cam surface to open and close said cutters as said handle members are opened or closed, means between said handle members continuously tending to open the same.

6. In a pruning implement, a first and a second handle member, a cutter head integrally formed with said first handle member and projecting laterally therefrom, a second cutter head pivoted to said first handle member adjacent to said first mentioned cutter head, said second cutter head having a laterally projecting heel provided with a cam surface, said second handle member having laterally projecting ears pivoted to said first handle member, means on said second handle member to coöperate with said cam surface to open and close said cutters as said handle members are opened or closed, means between said handle members continuously tending to open the same, said movable cutting member having two cutting edges one to coöperate with said fixed cutting member and the other cutting edge being located opposite to said first mentioned cutting edge, and means for holding said handle members closed together whereby said cutter heads may be maintained with their cutting edges closed, substantially as shown and for the purposes described.

KAYOZI TSUBOI.

Witnesses:
W. J. MAKELIM,
I. S. ARMSTRONG.

Copies of this patent may be obtained for five cents each, by addressing the "Commissioner of Patents, Washington, D. C."